United States Patent [19]
Webber

[11] 3,880,851
[45] Apr. 29, 1975

[54] ANTIBIOTIC METHOD

[75] Inventor: John Alan Webber, Indianapolis, Ind.

[73] Assignee: Eli Lilly and Company, Indianapolis, Ind.

[22] Filed: Feb. 19, 1974

[21] Appl. No.: 443,548

Related U.S. Application Data

[63] Continuation-in-part of Ser. Nos. 211,783, Dec. 24, 1971, abandoned, and Ser. No. 153,065, June 14, 1971.

[52] U.S. Cl. ............................................. 424/246
[51] Int. Cl. ............................................. A61k 27/00
[58] Field of Search ................................. 424/246

[56] References Cited
UNITED STATES PATENTS
3,674,784  4/1972  Webber .................. 424/246

*Primary Examiner*—Jerome D. Goldberg
*Attorney, Agent, or Firm*—William B. Scanlon; Everet F. Smith

[57] ABSTRACT

Inhibiting the growth of Serratia, Pseudomonas, indole positive Proteus, and Enterobacter bacteria by treating the locus of such organisms with 3-substituted vinyl cephalosporin compounds of formula

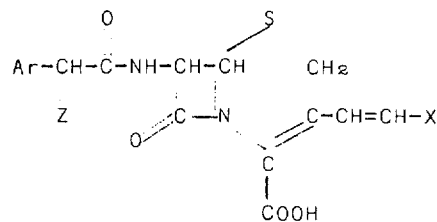

wherein Ar is phenyl, 2-thienyl, 3-thienyl; Z is —COOH, and X is COOH, —COO($C_1$ to $C_2$-alkyl), or a pharmaceutically acceptable salt thereof.

5 Claims, No Drawings

ANTIBIOTIC METHOD

CROSS REFERENCE

This is a continuation-in-part of my copending applications Ser. No. 211,783, filed Dec. 24, 1971 now abandoned and Ser. No. 153,065, filed June 14, 1971.

INTRODUCTION

This invention relates to methods for inhibiting the growth of microorganisms and to the use of certain cephalosporins for that purpose. More particularly, this invention provides a method for treating infections caused by organisms which are often resistant to presently commercial cephalosporin antibiotics.

BACKGROUND OF THE INVENTION a. General Cephalosporin History.

Cephalosporin C, obtained by fermentation, has been defined as having the following structure:

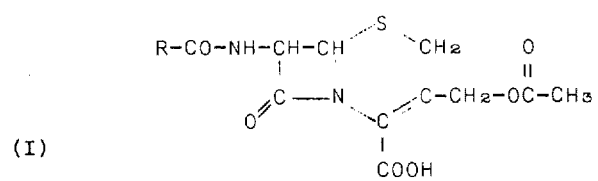

(I)

wherein R is $HOOC-CH(NH_2)-(CH_2)_3-$. It is also known as 7-(5'-aminoadipamido)cephalosporanic acid. It has weak antibiotic activity, but it is important as a source of cephalosporin C nucleus, i.e., 7-aminocephalosporanic acid (7-ACA), having the structural formula

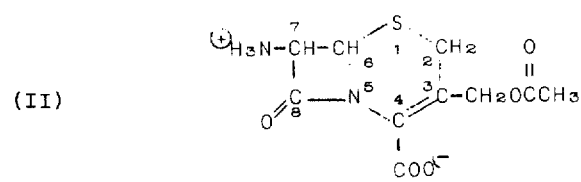

(II)

shown here in zwitterionic form, although anionic and cationic salts may be formed and used. Antibiotics such as cephalothin and cephaloridine are prepared from 7-ACA by known methods. Various derivatives of 7-ACA based antibiotics are made by acylating the 7-amino group of 7-ACA with appropriate acyl acids, halides, or other reactive form of such acyl groups and/or by replacing the acetoxy group attached to the 3-methyl carbon atom with appropriate nucleophilic groups now well documented in the literature.

In continued research, desacetoxycephalosporin compounds, i.e., compounds of the structure

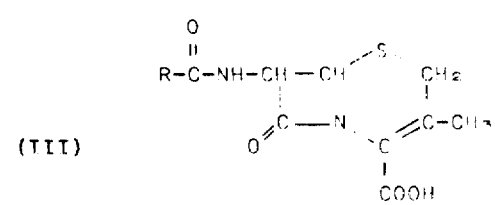

(III)

where R is the residue of the acyl group have been prepared. An important known antibiotically active compound in this class is cephalexin, an orally active cephalosporin antibiotic. Morin and Jackson (U.S. Pat. No. 3,275,626) discovered a process for preparing the desacetoxycephalosporanic acid derivatives by rearranging a penicillin sulfoxide ester to the corresponding desacetoxycephalosporin ester, and then removing the ester group. Desacetoxycephalosporanic acid derivative antibiotics are thus obtainable from a penicillin starting material. The compounds are sometimes, for convenience, referred to as being derivatives of 7-aminodesacetoxycephalosporanic acid (7-ADCA) having the structure

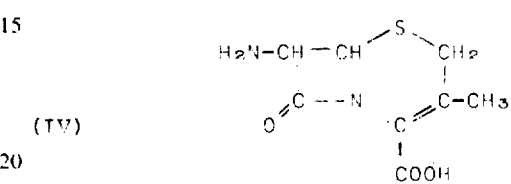

(IV)

In *Antimicrobial Agents and Chemotherapy* - 1966, copyright, 1967, pp. 715-726, Flynn, in his article entitled "Biological and Chemical Studies of the Cephalosporins" related that no activity was observed for cephalothin and 7-[2-(2''-furyl)acetamido]cephalosporanic acid against Pseudomonas strains or against indole positive Proteus. Also, he reported that some strains of the Klebsiella-Aerobacter group were not inhibited by a useful range of concentrations of those compounds. With six other cephalosporin compounds, substituted in the 3-position thereof, he reported that no Pseudomonas activity was observed for those compounds. Flynn and Godzeski reported (*Antibiotics*, Vol. 1 Mechanism of Action, (1967) "Penicillins and Cephalosporins, I. In Vitro," pp. 1-19) that although cephalothin, cephaloridine and cephaloglycin exhibit a wide range of activity against both Gram-positive and Gram-negative pathogens, disc plate assays with these and other antibiotics showed little, if any, in vitro activity against indole positive Proteus sp. Also, Weinstein, et al., in their article entitled "*The Cephalosporins*" in *Annals of Internal Medicine*, Vol. 72, pp. 729-739 (1970) report that Aerobacter species are highly resistant to cephalothin.

It is an object of this invention to provide a method for inhibiting the growth of Serratia, Pseudomonas, indolepositive Proteus strains, and Enterobacter species.

It is also an object of this invention to provide a new use of 3-(2'-carboxy- and 2'-carboalkyloxyvinyl)-7-[2'-carboxy-2'-phenyl- or 2''- or 3''-thienyl)acetamido]-3-cephem-4-carboxylic acid as antibacterial agents against the above-named types of microorganisms.

SUMMARY OF THE INVENTION

Briefly, by this invention it has been discovered that 3-(2'-carboxy- or 2'-carboalkyloxyvinyl)-7-[2'-carboxy-2'-(phenyl or thienyl)- acetamido]-3-cephem-4-carboxylic acids and the pharmaceutically acceptable salts thereof are useful as antibacterial agents against one or more of Serratia, Pseudomonas indole-positive Proteus and Enterobacter bacteria, and can be employed in treating infections in warm blooded animals attributable to these microorganisms.

DETAILED DESCRIPTION OF THE INVENTION

This invention provides a method for inhibiting the growth of Serratia, Pseudomonas, indole positive Proteus and Enterobacter bacilli which comprises treating the locus of such bacterial microorganisms with an effective amount of a cephalosporin compound of the formula

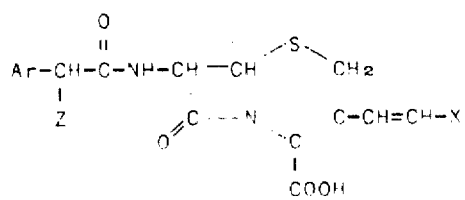

wherein Ar is phenyl, 2-thienyl or 3-thienyl; Z is —COOH, and X is —COOH or —COO($C_1$ to $C_2$-alkyl), or a pharmaceutically acceptable salt of such cephalosporin compound.

Examples of compounds of the above-defined type which can be used in accordance with this invention include:

3-(2'-carboxyvinyl)-7-[2'-carboxy-2'-phenylacetamido]-3-cephem-4-carboxylic acid, 3-(2'-ethoxycarbonylvinyl)-7-[2'-carboxy-2-phenylacetamido]-3-cephem-4-carboxylic acid, 3-(2'-carobxyvinyl)-7-[2'-carboxy-2'-(2''-thienyl)acetamido]-3-cephem-4-carboxylic acid, or a pharmaceutically acceptable salt of such compounds, e.g., the sodium, potassium, calcium, ammonium, monomethyl-, dimethyl- and trimethylammonium, monoethanolamine, cyclohexylbis (methylamine) salts, or the like.

The compounds described above have some antibacterial activity against a variety of Gram-positive and Gram-negative organisms as do other cephalosporin compounds such as those mentioned above. However, these compounds are of particular interest because they have shown substantial activity against one or more representative Serratia, Pseudomonas, Enterobacter and indole positive Proteus strains in standard gradient plate assay procedures. Activity in these gradient plate tests against various organisms has been indicative of antibiotic activity of all of the presently commercial cephalosporin antibiotics, namely sodium cephalothin, cephaloridine, cephaloglycin and cephalexin. For example, the compound 3-(2'-carboxyvinyl)-7-(2'-carboxy-2'-phenylacetamido)-3-cephem-4-carboxylic acid and 3-(2'-ethoxycarbonylvinyl)-7-(2'-carboxy-2'-phenylacetamido)-3-cephem-4-carboxylic acid and 3-(2'-carboxyvinyl)-7-[2'-carboxy-2'-(2''-thienyl)acetamido]-3-cephem-4-carboxylic acid have shown significant antibiotic activity against *Pseudomonas aeruginosa* at concentrations under 100 micrograms/ml. in standard gradient plate assays. The presently commercial cephalosporin antibiotics have not shown any antibiotic activity against these organisms at concentrations low enough to be of practical significance.

In practicing this invention, the selected cephalosporin antibiotic compound of the above-described type can be formulated into liquid pharmaceutical form, e.g. in water, isotonic saline or dextrose solutions or the like, and administered by intramuscular injection or by intravenous administration procedures to provide dosages of from about 125 mg. to 16 grams per day, depending upon the patient's body weight, the disease condition being treated, and other factors of concern to the patient's physician. In some cases, these compounds can be administered 1 to 6 times per day by the oral route in dry encapsulated or tableted formulations containing from 125 to 500 mg. per capsule or tablet in which case the compound might be diluted with pharmaceutical grade starch, talc, carboxymethylcellulose or other conventional diluent.

The compounds used in the method of this invention can be prepared by reacting a 3-formyl cephalosporin sulfide or sulfoxide ester with a phosphorane of the formula $$R_1R_2R_3P=CH-X$$

wherein each of $R_1$, $R_2$, and $R_3$ is bonded to the phosphorus atom and is a hydrocarbon radical free of aliphatic unsaturation containing from 1 to 8 carbon atoms, preferably phenyl or n-butyl; and X is a group as defined above to convert the 3-formyl group of the cephalosporin sulfide or sulfoxide ester to a 3-(substituted) vinyl cephalosporin sulfide or sulfoxide ester. Thereafter a variety of conventional process routes exemplified below can be used to obtain any desired cephalosporin antibiotic compound. The 3-(substituted)vinyl cephalosporin sulfoxide ester intermediates, obtained in the above-described (Wittig) reaction [See *Organic Reaction*, Vol. 14, (1965) Chapter 3, pp. 270–490] can be reduced to the sulfide stage, the 7-acyl side chain can be cleaved to obtain the 7-amino compound which can be converted to a salt if desired, the 7-amino compound can be reacylated with any desired acyl group, for example, with tert-butyl phenylmalonyl chloride or an analogous derivative, of thienylmalonic acid, and then any protecting groups can be removed, all by methods now known to obtain the desired 3-(substituted)vinyl cephalosporanic acid derivative which can be isolated from the reaction mixture, purified, and converted to a pharmaceutical dosage form for use as an antibiotic in therapy against a variety of infectious diseases.

Alternatively, the 3-(substituted)vinyl cephalosporin sulfoxide ester, obtained from the first step of the process described above, can be reduced, the 7-acyl group can be cleaved to obtain the new 3-(substituted)vinyl-7-amino-3-cepham-4-carboxylic acid ester compounds, or in addition the ester group can be removed to obtain the 7-amino-acid (both esters and acids being referred to as nucleus compounds), which are useful as intermediates in preparing the cephalosporin antibiotics by acylating the 7-amino group by conventional acylation procedures to obtain the desired 3-(substituted)vinyl cephalosporanic acid antibiotic compound.

The process can be applied to any 3-formyl cephalosporin sulfide or sulfoxide ester. Starting materials can be obtained from a variety of sources. For example, penicillin V and penicillin G and numerous other penicillins can be converted by procedures now known to the corresponding desacetoxycephalosporin esters having the phenoxyacetyl (from penicillin V) or the phenylacetyl (from penicillin G) by the Morin/Jackson process described in U.S. Pat. No. 3,275,626, as improved by the Cooper (U.S. application Ser. No. 838,697, filed July 2, 1969 now U.S. Pat. No. 3,647,789) and Hatfield (U.S. Pat. No. 3,591,585) inventions. Such desacetoxycephalosporin esters can be converted to the 3-hydroxymethyl cephalosporin ester, and oxidized to the corresponding 3-formylcephalosporin sulfoxide esters, as set forth in application Ser. No. 58,678, filed July 27, 1970 now U.S. Pat. No. 3,674,784, which is incorporated herein by reference thereto. In addition, the 3-formyl cephalosporin sulfide or sulfoxide ester can be obtained from cephalosporin C and its derivatives. For example, 7-amino-cephalosporanic acid can be treated with an esterase from *Bacillus subtilis* or with orange peel esterase to form 7-aminodesacetylcephalosporanic acid which can be acylated on the 7-amino group and then esterified, e.g., with diphenyldiazomethane by known procedures to form a sulfide starting material for use in making compounds used in the method of this invention. Alternatively, the compound can be oxidized to the sulfoxide to form, e.g., benzhydryl 7-(protected amino) desacetylcephalosporanate ester sulfoxide, for use in the process of making compounds used in the method of this invention. Normally, when starting from cephalosporin C it will be preferred to protect the 5-amino group in the 5-aminoadipoyl side chain of cephalosporin C by procedures now known, for example, by benzyloxycarbonyl or tert-butoxycarbonyl, or by an $C_2$ to $C_6$-alkanoyl group and to protect the carboxyl groups with an easily removed ester. Then the protected cephalosporin C derivative can be oxidized with a peracid such as metachloroperbenzoic acid, or hydrogen peroxide, and the 3-acetoxymethyl group can be converted to the 3-hydroxymethyl group by known chemical or enzymatic procedures, e.g., by treatment with orange peel esterase to obtain the protected 3-hydroxymethylcephalosporin C sulfoxide ester derivative. This derivative can be oxidized with chromium trioxide, manganese dioxide, dichlorodicyanoquinone, nickel peroxide or the like to obtain the 3-formyl cephalosporin C sulfoxide ester starting material. The use of chromium trioxide, particularly chromium trioxide in sulfuric acid/water, commonly referred to as "Jones Reagent" [Fieser and Fieser, *Reagents for Organic Synthesis*, Vol. 1, page 142, John Wiley and Sons, Inc. 1967] is preferred. Since it it contemplated that the 5-aminoadipoyl side chain will be cleaved by known procedures later on in the process it is not essential to protect the reactive groups therein, but better yields of the nucleus 7-amino cephalosporin compounds are generally obtained if those groups are protected.

The phosphorane compounds which are used in preparing the cephalosporin compounds can be prepared by conditions which are well known. Some of such phosphorane compounds are commercially available. Procedures for making various phosphoranes are disclosed, e.g., in *Journal of Organic Chemistry*, Volume 22, (1957), pp. 41 to 45 in an article entitled "Phosphinemethylenes. II. Triphenylphosphineacylmethylenes" by F. Ramirez and S. Dershowitz; *Journal of the Chemical Society*, 1959, pp. 3,874–3,876, in an article entitled "*The Phosphobetaines: Preparation and Properties*" by S. Trippett and D. M. Walker; *Journal of Organic Chemistry*, Vol. 27, 1962, pp. 998–1,000 in article entitled "The Preparation and Reactions of Some Halophosphoranes" by D. B. Denney and S. T. Ross; and in *Organic Reactions*, Vol. 14, (1965), Chapter 3, pp. 270–490. Published by John Wiley and Sons, New York, London, and Sydney.

Examples of preferred phosphoranes useful for preparing the compounds described herein include those of the formula

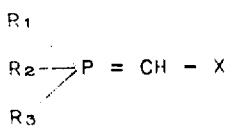

where each of $R_1$, $R_2$, and $R_3$ is phenyl or $C_1$ to $C_6$-alkyl such as methyl, ethyl, propyl, n-butyl, and is preferably phenyl or n-butyl and X is —COOH or —C(O)OR$^3$, where $R^3$ is $C_1$ to $C_6$-alkyl, for example, Methoxycarbonylmethylenetriphenylphosphorane, Ethoxycarbonylmethylenetriphenylphosphorane and tert-Butoxycarbonylmethylenetriphenylphosphorane.

The corresponding tri-n-butylphosphoranes are also preferred examples.

Specific cephalosporin starting materials, intermediates and products used in preparing the compounds used in the method of this invention are named, for convenience, by use of the "cepham" nomenclature system which has been adapted to cephalosporin compounds from an analogous nomenclature system based on "penam" for naming specific penicillin compounds. "Penam" nomenclature for the penicillins is described by Sheehan, Henery-Logan, and Johnson in the *Journal of the American Chemical Society* (JACS), 75, 3292, footnote 2 (1953). This system was adapted to the cephalosporins by Morin et al., in *JACS*, 84, 3400 (1962). In accordance with these systems of nomenclature, "penam" and "cepham" refer respectively to the following saturated ring systems

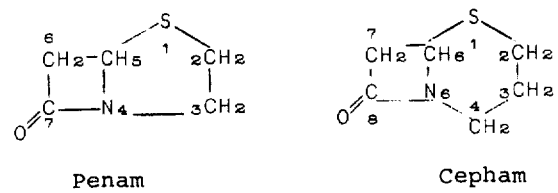

Penam                  Cepham

Cephem refers to the cephem ring structure containing a double bond, the position of which is indicated by an integer preceeding the cephem denoting the lowest numbered carbon atom to which the double bond is connected. Some persons choose to indicate the position of the double bond by use of a prefix Δ with an integer superscript, or the word "delta" with the same number relationship. However, we prefer not to use the delta symbol. For example, a 3-formyl cephalosporin sulfoxide ester used as a starting material in preparing the cephalosporin compounds can be named tert-butyl 3-formyl-7-phenoxyacetamido-3-cephem-4-carboxylate-1-oxide. A compound used in the method can be named 3-(2'-carboxyvinyl)-7-[α-carboxy-α-phenylacetamido]-3-cephem-4-carboxylic acid.

In preparing the compounds, the phosphorane (Wittig reagent) is commingled with the 3-formyl cephalosporin sulfide or sulfoxide ester, preferably while the latter is dissolved, at least partially, in a substantially anhydrous organic liquid medium at temperatures above the freezing point of the mixture to reflux temperatures, (generally not above 150°C) until the 3-

(substituted)vinyl cephalosporin sulfide or sulfoxide ester is formed. The mixture may be allowed to stand for several days, but the mixture is preferably agitated to insure contact of the reactants and to shorten the reaction time. When the reaction is completed the 3-(substituted)vinyl cephalosporin sulfide or sulfoxide ester can be separated from the phosphine oxide by-product, and recovered from the reaction mixture, and purified by conventional means. A molar equivalent of the phosphorane reactant, relative to the molar content of the 3-formyl cephalosporin sulfide or sulfoxide ester starting material, is usually sufficient although efficient practice may dictate that an excess of the phosphorane reagent be used to insure complete reaction of the more expensive 3-formyl cephalosporin.

Procedures for reducing $\Delta^3$-cephalosporin sulfoxide acids and esters to the corresponding sulfide state are described, for example, in U.S. application Ser. No. 764,925, filed Oct. 3, 1968 now U.S. Pat. No. 3,641,014. Briefly, by that process a 3-(substituted)vinyl cephalosporin sulfoxide ester of this invention can be treated with a reducing agent selected from the group consisting of:

1. hydrogen in the presence of a hydrogenation catalyst;
2. stannous, ferrous, cuprous, or manganous cations,
3. dithionite, iodide, or ferrocyanide anions,
4. trivalent phosphorus compounds having a molecular weight below about 500,
5. halosilane compounds of the formula

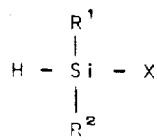

where X is chlorine, bromine, or iodine, and each of $R^1$ and $R^2$ is hydrogen, chlorine, bromine, iodine, or a hydrocarbon radical free from aliphatic unsaturation and having from 1 to 8 carbon atoms, and 6. a chloromethylene iminium chloride of the formula

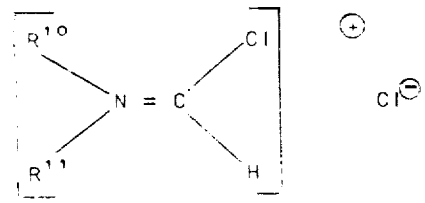

wherein each of $R^{10}$ and $R^{11}$ taken separately denote a $C_1$ to $C_3$-alkyl or taken together with the nitrogen to which they are bonded complete a monocyclic heterocyclic ring having from 5 to 6 ring forming atoms and a total of from 4 to 8 carbon atoms, in the presence or absence of an activating agent (depending upon the choice or reducing agent) which is an acid halide of an acid of carbon, sulfur or phosphorus, which acid halide is inert to reduction by the reducing agent, and which acid halide has a second order hydrolysis constant equal to or greater than that of benzoyl chloride, in a substantially anhydrous liquid medium at a temperature of from about −20°C to about 100°C to form the 3-(substituted)vinyl cephalosporin ester.

When the sulfoxide reduction is completed the 3-(substituted)vinyl cephalosporin ester can be treated by alternative methods. If the 7-acylamido side chain is the desired one, then the ester group can be removed by known methods to obtain the antibiotically active 3-(substituted)vinyl cephalosporin acid, either as such, or as a pharmaceutically acceptable salt. In some cases, it is desired to remove the 7-acyl group, such as the phenoxyacetyl (derived from penicillin V) or phenylacetyl (derived from penicillin G) group to obtain the respective 7-amino 3-(substituted)vinyl cephalsoporin ester or acid nucleus compound, either as such or as an acid addition salt thereof. The nucleus compound is then acylated to make a 3-(substituted)vinyl cephalosporin antibiotic acid and salt compound, which has an antibiotic spectrum desired for the method of this invention. In such cases, the 7-acylamido-3-(substituted)vinyl cephalosporin ester is treated by any of a variety of known procedures such as the $PCl_5$/pyridine: methanol: water procedure to cleave the 7-acyl side chain. Alternatively, a nitrosyl chloride cleavage procedure described in U.S. Pat. No. 3,188,311, or an improved procedure described in U.S. Pat. No. 3,261,832 can be used. Other 7-acyl cleavage procedures for cephalosporin compounds are described, e.g., in U.S. Pat. No. 3,272,809, and in U.S. application Ser. No. 805,823, filed Mar. 10, 1969. The 7-amino 3-(substituted)vinyl cephalosporin ester compounds can be purified and recovered by procedures, now known, such as that described in U.S. Pat. No. 3,507,860.

The 7-amino 3-(substituted)vinyl cephalosporin ester and acids, and salts thereof are then re-acylated in single or multiple step processes to prepare 3-(substituted)vinyl cephalosporin antibiotics used in the method of this invention.

The 7-amino-3-(substituted)vinyl cephalosporin compounds can be acylated with phenylmalonic acid or 2-thienyl-or 3-thienylmalonic acid derivatives to obtain compounds such as 3-(2'-carboxyvinyl)-7-[2'-carboxy-2'-(3''-thienyl)acetamido]-3-cephem-4-carboxylic acid, 3-(2'-methoxycarbonylvinyl)-7-[2'-carboxy-2'-(2''-thienyl)acetamido]-3-cephem-4-carboxylic acid, 3-(2'-carboxyvinyl)-7-[2'-carboxy-2'-phenylacetamido]-3-cephem-4-carboxylic acid, 3-(2'-ethoxycarbonylvinyl)-7-[2'-carboxy-2'-phenylacetamido]-3-cephem-4-carboxylic acid, and the like. These compounds have, surprisingly, shown antibiotic activity against one or more of *Serratia marcescens*, *Psuedomonas aeruginosa*, as well as against indole positive Proteus strains, and some Enterobacter Aerobacter species of microorganisms in standard primary screening tests.

The following detailed examples exemplify how the compounds used in the method of this invention can be made.

EXAMPLE 1 tert-BUTYL 3-(2'-ETHOXYCARBONYLVINYL)-7-PHENOXYACETAMIDO-3-CEPHEM-4-CARBOXYLATE-1-OXIDE To a solution of 0.5 millimole of tert-butyl 3-formyl-7-phenoxyacetamido-3-cephem-4-carboxylate-1-oxide in 10 cc. of dry benzene was added 175 mg. (1 equivalent) of (carbethoxymethylene)triphenylphosphorane. After allowing the reaction mixture to stand at room temperature for 11 days, the solvent was removed under reduced pressure, the residue taken up in hot ethyl acetate, and cooled to yield 140 mg. of crystalline triphenylphosphine oxide (m.p., 155°–157°C.) as by-product.

The mother liquors were purified by preparative thin-layer chromatography on silica gel, eluting with a 1:1 v/v benzene-ethyl acetate mixture to give 247 mg. of the above-named product as a noncrystalline material. The infrared (IR) and nuclear magnetic resonance (NMR) spectra were in accord with the structure for the named product.

EXAMPLE 2 tert-BUTYL 3-(2'-ETHOXYCARBONYLVINYL)-7-PHENOXYACETAMIDO-3-CEPHEM-4-CARBOXYLATE To a cooled (0°C. to 5°C.) solution of 200 mg. of tert-butyl 3-(2'-ethoxycarbonylvinyl)-7-phenoxyacetamido-3-cephem-4-carboxylate-1-oxide in 10 cc. of dry 8:2 v/v acetonitrile dimethylformamide mixture there was added 400 mg. of anhydrous stannous chloride and then 0.45 cc. of acetyl chloride. After 15 minutes at 0°C. to 5°C. and 2 hours at room temperature the solvent was removed under reduced pressure, the residue taken up in ethyl acetate and washed with saturated aqueous sodium chloride solution, with cold five percent hydrochloric acid, saturated aqueous sodium bicarbonate solution, saturated aqueous sodium chloride solution, and then dried over magnesium sulfate. The mixture was then filtered and the filtrate was evaporated under reduced pressure to give 175 mg. of a yellow oil which was purified by preparative thin-layer chromatography on silica gel, with elution by a 3:1 v/v benzene:ethyl acetate mixture. The above-named ester product would not crystallize, but was characterized by its NMR spectrum (vinyl protons at 6.01δ and 7.96δ) (J = 16 Hz).

EXAMPLE 3 tert-BUTYL 7-AMINO-3-(2'-ETHOXYCARBONYLVINYL)-3-CEPHEM-4-CARBOXYLATE-p-TOLUENE SULFONATE To a solution of 1.75 millimoles of oily tert-butyl 3-(2'-ethoxycarbonylvinyl)-7-phenoxyacetamido-3-cephem-4-carboxylate in 50 cc. of dry benzene was added 1.4 equivalents (196 milligrams) of dry pyridine and 1.4 equivalents (511 mg.) of phosphorus pentachloride. This mixture was heated at 58°–60°C. under a nitrogen atmosphere for 2 hours, evaporated under reduced pressure to dryness and 50 cc. of cold (0°C. to 5°C.) methanol was added. After 2 hours at room temperature, the methanol was removed under reduced pressure and the residue was dissolved in 50 cc. of cold (0°C. to 5°C.) 1/1 v/v tetrahydrofuran: pH 4.5 aqueous buffer. After thirty minutes at room temperature, the volume of the mixture was concentrated under reduced pressure, ethyl acetate was added, and the pH was adjusted to 6.5 with solid sodium bicarbonate. The organic layer was separated and washed twice with saturated aqueous sodium chloride solution, dried over magnesium sulfate, filtered and evaporated under reduced pressure to about 15 ml. A solution of 330 mg. of p-toluenesulfonic acid monohydrate (1 equivalent) in ethyl acetate was added. Refrigeration of the mixture produced 571 mg. of crystalline product. Recrystallization from isopropanol provided the titled ester-salt product, m.p., 151°–155°C., whose IR, UV, NMR, and elemental analyses were in accord with the structure for the desired structure.

Analysis, Calc.: C, 52.45; H, 5.74; N, 5.32.
Found: C, 52.50; H, 5.62; N, 5.32.

EXAMPLE 4 tert-BUTYL 7-AMINO-3-(2'-tert-BUTOXYCARBONYLVINYL)-3-CEPHEM-4-CARBOXYLATE-p-TOLUENESULFONATE To a stirred solution of tert-butyl 3-formyl-7-phenoxyacetamido-3-cephem-4-carboxylate-1-oxide (3.7 g., 8.55 mmoles), prepared as described above, in a mixture of 100 cc. of dry benzene and 100 cc. of isopropanol there was added 2.88 g. (0.95 equivalent, 8.12 mmoles) of (tert-butoxycarbonylmethylene)-triphenylphosphorane. After 68 hours at room temperature, the solvent was removed under reduced pressure to leave as residue crude tert-butyl 3-(2'-tert-butoxycarbonylvinyl)-7-phenoxyacetamido)-3-cephem-4-carboxylate-1-oxide.

This residue was dissolved in a mixture of 40 cc. of dry dimethylformamide and 40 cc. of dry acetonitrile, cooled to 0°C. to 5°C., and then 2.84 g. (17.1 mmoles) of potassium iodide and 8.6 cc. of acetyl chloride were added. After 30 minutes at 0°–5°C. and 30 minutes at room temperature, the reaction mixture was concentrated under reduced pressure, the residue was taken up in benzene, the benzene mixture was washed twice with saturated aqueous sodium chloride solution, twice with cold 5 percent hydrochloric acid solution, twice with saturated aqueous sodium bicarbonate solution, once with 10% w/v aqueous sodium thiosulfate, twice with saturated aqueous sodium chloride solution, dried over magnesium sulfate plus charcoal, filtered, and evaporated under reduced pressure to give as residue 6.5 g. of crude tert-Butyl 3-(2'-tert-butoxycarbonylvinyl)-7-phenoxyacetamido-3-cephem-4-carboxylate. This reduced product was combined with product from a similar reaction and purified by column chromatography over silica gel—15 percent water mixture. A portion of the purified ester, 500 mg., was dissolved in 70 ml. of benzene and the volume reduced to 50 cc. by distillation. Then 110 mg. (1.4 equivalents) of dry pyridine and 282 mg. (1.4 equivalents) of phosphorus pentachloride were added, and the reaction mixture, under $N_2$ atmosphere, was heated at 50°–55°C. for about 1.5 hours to form the iminochloride. After cooling to room temperature, the benzene was removed under reduced pressure and the residue was taken up in 0°C. to 5°C. methanol. After 3 hours at room temperature to insure formation of the methyl ether, the excess methanol was removed under reduced pressure and the residue was dissolved, with cooling (0° to 5°C.) in 30 cc. of tetrahydrofuran (THF) and 30 cc. of pH 4.5 aqueous buffer solution. After one-half hour, the THF was removed under reduced pressure, ethyl acetate was added and the pH was adjusted to 6.5 with solid sodium bicarbonate. The organic layer was separated, washed with saturated aqueous sodium chloride solution, dried over magnesium sulfate, filtered, and evaporated under reduced pressure to dryness. The tert-butyl 3-(2'-tert-butoxycarbonylvinyl)-7-amino-3-cephem-4-carboxylate residue was taken up in methylene chloride and 172 mg. (0.9 mmoles) of p-toluenesulfonic acid was added in a methylene chloride:ethyl acetate mixture. The title compound crystallized upon standing, m.p., 166°–168°C., and was characterized by IR, UV, NMR spectral analyses and elemental analysis.

Analysis, Calc.: C, 54.13; H, 6.18; N, 5.05.
Found: C, 53.92; H, 6.16; N, 5.18.

EXAMPLE 5 tert-BUTYL 3-(2'-tert-BUTOXYCARBONYLVINYL)-7-(2'-tert-BUTOXYCARBONYL-2'-PHENYLACETAMIDO)-3-CEPHEM-4-CARBOXYLATE To a cooled (0°–5°C.) suspension of 277 mg. (0.5 mmole) of tert-butyl 7-amino-3-(2'-tert-butoxycarbonylvinyl)-3-cephem-4-carboxylate-p-toluenesulfonate and 420 mg. (5 equivalents) of sodium bicarbonate in 20 cc. of dry acetone there was added about 1 mmole of tert-butyl phenylmalonic acid chloride (prepared from tert-butyl phenyl malonic acid in benzene plus oxalyl chloride and a trace of dimethylformamide [DMF] in acetone). After 10 minutes at 0°–5°C. and 1½ hours at room temperature, the reaction mixture was re-cooled to 0°C. to 5°C. and a few drops of water was added. After 10 minutes this mixture was evaporated under reduced pressure to dryness, the residue was taken up in ethyl acetate, the ethyl acetate solution was washed twice with cold 5 percent hydrochloric acid, with saturated aqueous sodium bicarbonate solution, with saturated aqueous sodium chloride solution, and then dried over magnesium sulfate, filtered and evaporated under reduced pressure. The oily tert-butoxycarbonylvinyl)-7-(2'-tert-butoxycarbonyl-2'-phenylacetamido)-3-cephem-4-carboxylate ester was chromatographed over silica gel 15 percent water and eluted with 2 percent ethyl acetate in benzene. This title ester material crystallized from ethyl ether in the cold, m.p., 168°–170°C. and was characterized by IR, UV [$\lambda$max = 317 m$\mu$ ($\epsilon$ = 23,000] and by elemental analysis which follows.

Analysis, Calc.: C, 61.98; H, 6.71; N, 4.66.
Found: C, 62.12; H, 6.90; N, 4.72.

EXAMPLE 6

7-AMINO-3-(2'-CARBOXYVINYL)-3-CEPHEM-4-CARBOXYLIC ACID

A solution of 185 mg. of tert-butyl 7-amino-3-(2'-tert-butoxycarbonylvinyl)-3-cephem-4-carboxylate-p-toluenesulfonate in 20 ml. of 98–100 percent formic acid was stirred at room temperature for about 1 hour. The formic acid was removed under reduced pressure and after purging once with ethyl acetate, the residue was taken up in ethyl acetate:water mixture. The pH of the mixture was adjusted to 7.8 with saturated sodium bicarbonate solution and the organic layer was removed. The aqueous portion was cooled in an ice bath and the pH was adjusted to 3.0 by adding 5 percent hydrochloric acid. The precipitate which formed during hydrochloric acid addition was collected, yielding 80 mg. of the title product. A sample of the product turned orange when heated to 240°–250°C. but did not melt up to 290°C. The spectral data, IR, UV [$\lambda$max = 313 m$\mu$ ($\epsilon$ = 17,450)] and elemental analysis were consistent with the assigned structure:

Analysis, Calc.: C, 44.44; H, 3.73; N, 10.37.
Found: C, 44.70; H, 3.96; N, 10.10.

EXAMPLE 7

7-AMINO-3-(2'-ETHOXYCARBONYLVINYL)-3-CEPHEM-4-CARBOXYLIC ACID

A solution of 175 mg. of tert-butyl 7-amino-3-(2'-ethoxycarbonylvinyl)-3-cephem-4-carboxylate-p-toluenesulfonate in 20 ml. of 98–100 percent formic acid was stirred at room temperature for 2 hours. The excess formic acid was removed under reduced pressure and the residue was purged once with ethyl acetate and then taken up in ethyl acetate:water mixture. The pH of the mixture was adjusted to 8.0 with saturated sodium bicarbonate solution and the organic layer was separated and removed. The aqueous portion was cooled in an ice bath and the pH was adjusted to 3.5 with 5 percent hydrochloric acid. The precipitate which formed upon acid addition was collected, yielding 67 mg. of the title compound. It had a m.p. of 234°–237°C. (d), and the IR, UV [$\lambda$max. 324 m$\mu$ ($\epsilon$ = 14,800)] and elemental analysis were consistent with the assigned structure:

Analysis, Calc.: C, 48.32; H, 4.73; N, 9.39.
Found: C, 48.46; H, 5.01; N, 9.36.

EXAMPLE 8 tert-BUTYL 3-(2'-ETHOXYCARBONYLVINYL)-7-(2'-tert-BUTOXYCARBONYL-2'-PHENYLACETAMIDO)-3-CEPHEM-4-CARBOXYLATE Following the procedure of Example 5, the tert-butyl 7-amino-3-(2'-ethoxycarbonylvinyl)-3-cephem-4-carboxylate-p-toluenesulfonate ester salt was acylated with t-butyl phenylmalonic acid chloride to obtain the title compound as product. The structure was confirmed by IR, UV and elemental analysis:

Analysis, Calc.: C, 60.82; H, 6.34; N, 4.89.
Found: C, 60.72; H, 6.62; N, 4.68.

EXAMPLE 9

7-(2'-CARBOXY-2'-PHENYLACETAMIDO)-3-(2-ETHOXYCARBONYLVINYL)-3-CEPHEM-4-CARBOXYLIC ACID

A solution of 23 mg. of tert-butyl 7-[2'-tert-butoxycarbonyl)-2'-phenylacetamido]-3-(2'-ethoxycarbonylvinyl)-3-cephem-4-carboxylate, in 10 cc. of 98–100 percent formic acid was allowed to stand for one hour at room temperature. The formic acid was removed under reduced pressure. The residue (the titled product) was purged of residual formic acid by dissolving in ethyl acetate and evaporating to dryness and then dissolved in aqueous sodium bicarbonate solution to make a water soluble sodium salt for biological evaluation.

EXAMPLE 10

7-(2'-CARBOXY-2'-PHENYLACETAMIDO)-3-(2'-CARBOXYVINYL-3-CEPHEM-4-CARBOXYLIC ACID

In a manner similar to the procedure described in Example 9, the titled acid compound was prepared from tert-butyl 7-(2'-tert-butoxycarbonyl-2'-phenylacetamido)-3-(2'-tert-butoxycarbonylvinyl)-3- cephem-4-carboxylate, which ester was prepared by acylating tert-butyl 7-amino-3-(2'-tert-butoxycarbonylvinyl)-3-cephem-4-carboxylate-p-toluene sulfonate as described in Example 5.

EXAMPLE 11

BENZHYDRYL 7-[2'-tert-BUTOXYCARBONYL-2'-(2''-THIENYL)ACETAMIDO]-3-[2'-ETHOXYCARBONYLVINYL]-3-CEPHEM-4-CARBOXYLATE To a stirred solution of approximately 2.0 ml. of benzhydryl 7-amino-3-[2'-ethoxycarbonylvinyl]-3-cephem-4-carboxylate in 20 ml. of dry acetone at 6°C. there was added 504 mg. (6 mM.) of sodium bicarbonate as a solid and then 2.2 equivalent of freshly prepared 2-tert-butoxycarbonyl-2-(2'-thienyl)acetyl chloride in a mixture of 10 ml. of dry pyridine and 10 ml. of dry acetone. The mixture was stirred in the cold (0°-5°C.) for 10 minutes, and then room temperature for 0.5 hours and then after cooling again to 0°-5°C. a few drops of water were added. The volume of the reaction mixture was concentrated, ethyl acetate was added and the mixture was washed with cold (0°-5°C.) hydrochloric acid solution, with saturated sodium bicarbonate solution, with saturated sodium chloride solution, dried over magnesium sulfate, filtered, and concentrated to give 1.1 g. of a crude title product which was purified by column chromatography over silica gel with 15 percent water. The nuclear magnetic resonance (NMR) absorptions using deuteriochloroform as the standard were as consistent with the titled product.

The yield was 52.5 percent as a purified foam.

EXAMPLE 12

3-(2'-ETHOXYCARBONYLVINYL)-7-[2'-CARBOXY-2'-(2''-THIENYL)ACETAMIDO]-3-CEPHEM-4-CARBOXYLIC ACID

A solution of 13.8 mg. of benzhydryl 3-(2'-ethoxycarbonylvinyl)-7-[2'-tert.-butoxycarbonyl-2'-(2''-thienyl)acetamido]-3-cephem-4-carboxylate in 5 ml. of a 98 to 100 percent formic acid solution was allowed to stand at room temperature for 1 hour. The formic acid was removed by evaporation under reduced pressure and the residue was purged with ethyl acetate. The residue titled compound was immediately dissolved in aqueous sodium bicarbonate solution and submitted for testing as an antibiotic.

EXAMPLE 13

3-(CARBOXYVINYL)-7-[2'-CARBOXY-2''-(2''-THIENYL)-ACETAMIDO]-3-CEPHEM-4-CARBOXYLIC ACID

To a cooled (0°-5°C.) suspension of 0.2 mM. (111 mg.) of tert-butyl 7-amino-3-(2'-tert-butoxycarbonylvinyl)-3-cephem-4-carboxylate, p-toluene sulfonic acid salt and 1 mM. of sodium bicarbonate in 8 cc. of dry acetone there was added about 3 equivalents of 2-tert-butoxycarbonyl-2-(2''-thienyl)acetyl chloride (prepared for the corresponding acid and oxalyl chloride in benzene containing a trace of dimethylformamide) in 4 cc. of acetone. After 10 minutes in the cold, (0°-5°C.) and 50 minutes at room temperature, the reaction mixture was cooled to 0°-5°C. and quenched by the addition of water. After 5 minutes, the reaction mixture was poured into ethyl acetate and washed with aqueous sodium chloride solution, with cold 5 percent hydrochloric acid solution, with aqueous sodium bicarbonate solution, with sodium chloride solution, dried over magnesium sulfate, filtered and evaporated to give 145 mg. of crude product.

After purification by preparative thin layer chromatography there was obtained 35 mg. of tert.-butyl 7-[2'-tert-butoxycarbonyl-2'-(2''-thienyl)acetamido]-3-(2'-tert-butoxycarbonylvinyl)-3-cephem-4-carboxylate, characterized by nuclear magnetic resonance: vinyl H doublets centered at $\delta 5.84$ and $\delta 7.74$, $\beta$-lactam hydrogen at $\delta 4.90$ doublet (C-6) and about $\delta 5.78$(C-7), side chain methine at $\delta 4.88$ (singlet).

A solution of 12.1 mg. of the above ester in 5 cc. of 98-100 percent formic acid was allowed to stand at room temperature for 55 minutes. The formic acid was removed by evaporation under reduced pressure and the residue was purged with ethyl acetate. The residual product was dissolved in aqueous sodium bicarbonate solution, and submitted for antibiotic testing.

EXAMPLE 14

This example illustrates the antibiotic activities of two of the compounds used in the method of this invention against a variety of bacterial cultures. In this test discs (about 6.35 mm. in diameter) saturated with 30 micrograms of the respective test compound were placed on agar plates containing the bacterial culture. The test procedure followed was that described by A. W. Bauer, et al., in their article entitled "Antibiotic Susceptibility Testing By a Standardized Single Disk Method" in *The American Journal of Clinical Pathology*, (1966), Vol. 45, No. 4, pp. 493–496.

The compounds tested were

A. 3-Carboxyvinyl 7-[2'-phenyl-2'-carboxyacetamido]-3-cephem-4-carboxylic acid
B. 3-Ethoxycarbonylvinyl-7-[2'-phenyl-2'-carboxyacetamido]-3-cephem-4-carboxylic acid
C. Sodium cephalothin The results are given in the table which follows:

| Bacterial Culture | | Zone Diameter (mm) Surrounding 30-µg Discs (6.35 mm diameter) | | |
|---|---|---|---|---|
| | | A | B | C |
| Pseudomonas aeruginosa | PS 9 | 14.6 | 7.4 | <6 |
| P. aeruginosa | PS15 | 16.4 | 10.8 | <6 |
| P. aeruginosa | PI 1 | <6 | <6 | <6 |
| P. aeruginosa | PI21 | 14.7 | <6 | <6 |
| Serratia marcescens | SE 2 | 24.0 | 24.5 | <6 |
| S. mercescens | SE 3 | 24.5 | 25.3 | <6 |
| S. marcescens | SE 6 | Slight | 11.8* | <6 |
| Proteus rettgeri (I+) | PR 2 | 31.8 | 23.0 | <6 |
| Proteus mirabilis (I−) | PR 3 | 30.4 | 31.0 | 20.0 |
| Enterobacter cloacae | EB 5 | 25.4* | 24.8* | <6 |
| Klebsiella pneumoniae | KL 3 | 25.2 | 26.6 | 24.6 |
| Escherichia coli | EC14 | 26.2 | 27.0 | 21.4 |
| Staphylococcus aureus | 3074 | Slight | 19.4 | 30.0 |

*Colonies within the inhibition zone.
Footnotes: + = gentamycen resistant; < = less than; I + = Indole positive

EXAMPLE 15

This example summarizes antibiotic activities of representative examples of compounds used in a gradient plate test procedure described hereinbelow.

Compounds of the above described type, examples of which are given below, have been found to have substantial antibiotic activity [minimum inhibitory concentration (MIC), values] or less than 50 micrograms/ml. in the absence of human serum in a standard gradient plate testing procedure against *Serratia marcescens* (Lilly identification No. X-99). The method used is essentially that described by Bryson and Szybalski in 1952 (*Science* 116:45-46). The inoculum treatment method used for penicillin resistant Staphylococci was reported by Godzeski, et al., in *Antimicrobial Agents and Chemotherapy*, May 1961, pp. 547-554.

A standard Falcon square plastic petri dish is used. A layer of agar (10 ml.) is poured into one of the square dishes, the dish tipped 5 mm. off the horizontal, and the agar layer allowed to harden in this position. This bottom layer of agar contains the antibiotic, the serum, and/or other material to be tested. The medium is Difco Penassay Agar containing 2 percent agar. We routinely used 4 ml. of human or horse serum for "serum-inactivation" testing. Serum may be added to the top layer also so that no serum gradient will exist, but after testing many antibiotics in this manner, no significant differences were noted in the final results between the two types of serum plates. Therefore, serum is routinely added only to the bottom layer.

After the bottom, slanted layer of agar medium has hardened, the plate is placed flat and another 10 ml. of medium added and allowed to harden.

The inoculum of bacterial organism, as described, is prepared by diluting the water suspension 1/50 in 0.25 percent agar in sterile water or saline. For Gram-negative organisms, an overnight broth culture is diluted 1/50 in the 0.25 percent agar-water. This dilution is thoroughly shaken to evenly suspend the bacteria. The plates are then streaked with the inoculum by means of a pipet.

After 24 hours incubation at 35°-37°C., the plates are read by measuring the length of bacterial growth as a percentage of the entire streak distance which is then converted to the percent of antibiotic concentration in the plate.

Average values of duplicate measurements are calculated and the M.I.C.'s reported are averages of 2 streaks on the plate and from 2 to 3 duplicate plates. Eight streaks can be easily placed on each plate. If sharp end points are not obtained, the middle concentration between the beginning of inhibition of the streak to the end of growth is measured. The concentration of the antibiotic under examination is varied from plate to plate in a series as follows:

| 200 | μg/ml | Plate | No. 1 and 2 |
| 100 | μg/ml | Plate | No. 3 and 4 |
| 50 | μg/ml | Plate | No. 5 and 6 |
| 20 | μg/ml | Plate | No. 7 and 8 |
| 10 | μg/ml | Plate | No. 9 and 10 |
| 1 | μg/ml | Plate | No. 11 and 12 |

This method of screening antibiotics is quite satisfactory. Control plates containing a control antibiotic, are used daily for the screening test. The gradient plate method has shown differences between antibiotics that were not apparent by any other methods of screening. The antibiotic differences, when examined more closely by other methods, e.g., animal therapy, have proved correct.

The table below lists the minimum inhibitory concentration (MIC) in micrograms/milliliter (g/ml) for the listed compounds against *Serratia marcescens* in the absence of blood serum.

| Compound | MIC (μg/ml) vis. Serratia marcescens |
|---|---|
| Cephalothin, Na | >200 |
| Example 12 | 3.6 |
| Example 13 | 0.9 |
| Example 10 | 3.7 |
| Example 9 | 0.6 |

The in vivo activity of the compounds employed in the method of this invention is illustrated by the $ED_{50}$ (effective dose) values listed below for representative compounds. The $ED_{50}$ values were obtained in mice infected with more than a lethal dose of *Serratia marcescens* (SE7) by subcutaneous administration of the antibiotic at 1 and 5 hours postinfection. In this test, the disodium salt of 3-(2'-ethoxycarbonylvinyl)-7-(2'-carboxy-2'-phenylacetamido)-3-cephem-4-carboxylic acid had an $ED_{50}$ of 78.5 mg./kg. × 2. The trisodium salt of 3-(2'-carboxyvinyl)-7-(2'-carboxy-2'-phenylacetamido)-3-cephem-4-carboxylic acid had an $ED_{50}$ of 51.6 mg./kg. × 2.

In the standard agar dilution method, the above two compounds exhibited MIC values of 2 μg/ml. and 4 μg/ml., respectively, against *Serratia marcescens* (SE7).

Accordingly, this invention provides a method for treating Serratia, Pseudomonas, indole-positive Proteus, and Enterobacter infections in warm-blooded animals comprising administering to said infected animals an effective, non-toxic dose of a 3-substituted vinyl cephalosporin compound or a pharmaceutically acceptable salt thereof. As previously mentioned, the antibiotics described herein can be administered in a total daily dose of between about 125 mg. and 16 g. per day. In terms of dose per patient weight, they can be administered in individual doses ranging between about 50 mg./kg. and 500 mg./kg. of body weight. A desirable multi-dose regimen can comprise administering multiple individual doses of 125, 250, or 500 mg./kg. of body weight. In the multi-dose regimen, the individual doses can be administered 3 or 4 times daily or in the case of more severe infections, every 3 or 4 hours.

I claim:

1. A method for treating Serratia, Pseudomonas, indole-positive Proteus and Enterobacter infections in warmblooded animals comprising administering to said infected animals between 50 mg/kg and 500 mg/kg of the body weight of a 3-substituted vinyl cephalosporin compound of the formula

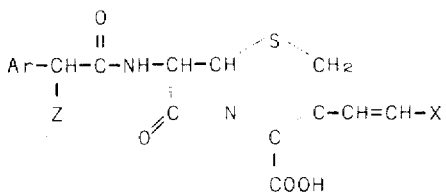

where Ar is phenyl, 2-thienyl or 3-thienyl, Z is —COOH, and X is —COO($C_1$ to $C_2$-alkyl) or —COOH, or a pharmaceutically acceptable salt of said cephalosporin compound.

2. A method as described in claim 1 wherein the compound is 3-(2'-carboxyvinyl)-7-[2'-carboxy-2'-phenylacetamido]-3-cephem-4-carboxylic acid, or a pharmaceutically acceptable salt thereof.

3. A method as described in claim 1 wherein the compound is 3-(2'-carboethoxyvinyl)-7-[2'-carboxy-2'-phenylacetamido]-3-cephem-4-carboxylic acid, or a pharmaceutically acceptable salt thereof.

4. A method as described in claim 1 wherein the compound is 3-(2'-carboxyvinyl)-7-[2'-carboxy-2'-(2''-thienyl)acetamido]-3-cephem-4-carboxylic acid, or a pharmaceutically acceptable salt thereof.

5. A method as described in claim 1 wherein the compound is 3-(2'-carboethoxyvinyl)-7-[2'-carboxy-2'-(2''-thienyl)-acetamido]-3-cephem-4-carboxylic acid, or a pharmaceutically acceptable salt thereof.

* * * * *